(12) United States Patent
Carnevali (10) Patent No.: US 8,454,178 B2
(45) Date of Patent: Jun. 4, 2013

(54) MIRROR ADAPTOR MOUNT

(76) Inventor: Jeffrey D. Carnevali, Seattle, WA (US)

(*) Notice: Subject to any disclaimer, the term of this patent is extended or adjusted under 35 U.S.C. 154(b) by 640 days.

(21) Appl. No.: 12/653,692

(22) Filed: Dec. 16, 2009

(65) Prior Publication Data

US 2011/0141595 A1 Jun. 16, 2011

(51) Int. Cl.
*G02B 7/182* (2006.01)
(52) U.S. Cl.
USPC ............................ 359/871; 359/875; 248/481
(58) Field of Classification Search
USPC .. 359/871, 875, 876, 881, 882, 883; 248/481, 248/487
See application file for complete search history.

(56) References Cited

U.S. PATENT DOCUMENTS

| 5,820,097 | A | * | 10/1998 | Spooner | 248/549 |
| 5,845,885 | A | * | 12/1998 | Carnevali | 248/181.1 |
| 2003/0169522 | A1 | * | 9/2003 | Schofield et al. | 359/876 |
| 2005/0046978 | A1 | * | 3/2005 | Schofield et al. | 359/876 |
| 2005/0063080 | A1 | * | 3/2005 | Xiao | 359/871 |
| 2005/0164541 | A1 | * | 7/2005 | Joy et al. | 439/352 |
| 2007/0096005 | A1 | * | 5/2007 | March et al. | 248/549 |
| 2012/0224065 | A1 | * | 9/2012 | Schofield et al. | 348/148 |

* cited by examiner

*Primary Examiner* — Frank Font
(74) *Attorney, Agent, or Firm* — Charles J. Rupnick Attorney at Law (57) ABSTRACT

A mirror adapter mounting device formed of a substantially rigid mounting base portion with one surface thereof comprising a wedge-shaped receiver slot, and a different surface thereof comprising a wedge-shaped coupler; a part-spherical ball coupler; and an arm projected from the mounting base portion and presenting the ball coupler adjacent to an end thereof distal from the mounting base portion.

20 Claims, 8 Drawing Sheets

MIRROR ADAPTOR MOUNT

FIELD OF THE INVENTION

The present invention relates generally to adapter devices, and in particular to quick release adapter devices for mounting mirrors on windshields.

BACKGROUND OF THE INVENTION

It is generally well-known to mount rear view mirrors on automobile windscreens or windshields. However, known structures for the mounting of rearview mirrors utilize the available windshield space inefficiently.

SUMMARY OF THE INVENTION

The present invention is a novel mirror adapter mounting device formed of a substantially rigid mounting base portion with one surface thereof comprising a wedge-shaped receiver slot, and a different surface thereof comprising a wedge-shaped coupler; a part-spherical ball coupler; and an arm projected from the mounting base portion and presenting the ball coupler adjacent to an end thereof distal from the mounting base portion.

According to one aspect of the novel mirror adapter mounting device, a mirror adapter mounting system includes a wedge-shaped windshield coupler having substantially parallel opposing front and rear planar surfaces spaced apart by opposing exterior side surfaces therebetween, the front surface being relatively narrower than the rear surface and being adapted for mounting on a windshield of a vehicle, and the opposing exterior side surfaces being tapered outwardly from the narrower front surface toward the wider rear surface; a mirror having a front coupler receiver slot formed as a negative wedge-shaped opening that is matched to the wedge-shaped windshield coupler, the receiver slot having a rear planar interior surface positioned between opposing interior side surfaces that are spaced apart and form an opening therebetween, the opening being relatively narrower than the rear interior surface, and the opposing interior side surfaces being tapered inwardly from the narrower opening toward the wider rear interior surface; and a mirror adapter mounting device having a substantially rigid base mounting base portion having a coupler receiver slot adapted to receive slidingly thereinto the wedge-shaped windshield coupler, a wedge-shaped coupler adapted to slidingly enter into the front coupler receiver slot of the mirror, and a ball coupler.

According to another aspect of the novel mirror adapter mounting device, a method is disclosed for providing an auxiliary ball coupler on a vehicle mirror mount, the method including, on a windshield having a wedge-shaped windshield coupler having a relatively narrower surface coupled to a surface of the windshield and a relatively wider surface spaced away therefrom with opposing tapered side surfaces therebetween, and a mirror having a wedge-shaped receiver slot being wedgedly engaged with the wedge-shaped windshield coupler, disengaging the wedge-shaped receiver slot of the mirror from the wedge-shaped windshield coupler; between the wedge-shaped windshield coupler and the wedge-shaped receiver slot of the mirror, engaging a mirror adapter mounting device, including: wedgedly engaging a wedge-shaped receiver slot of the mirror adapter mounting device with the wedge-shaped windshield coupler, and wedgedly engaging a wedge-shaped mirror coupler with the wedge-shaped receiver slot of the mirror; and from the mirror adapter mounting device projecting a substantially part-spherical ball coupler.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 13 is a side view showing the novel mirror adapter assembled with wedge coupler;

DETAILED DESCRIPTION OF PREFERRED EMBODIMENT

In the Figures, like numerals indicate like elements.

Figures 1, 2:
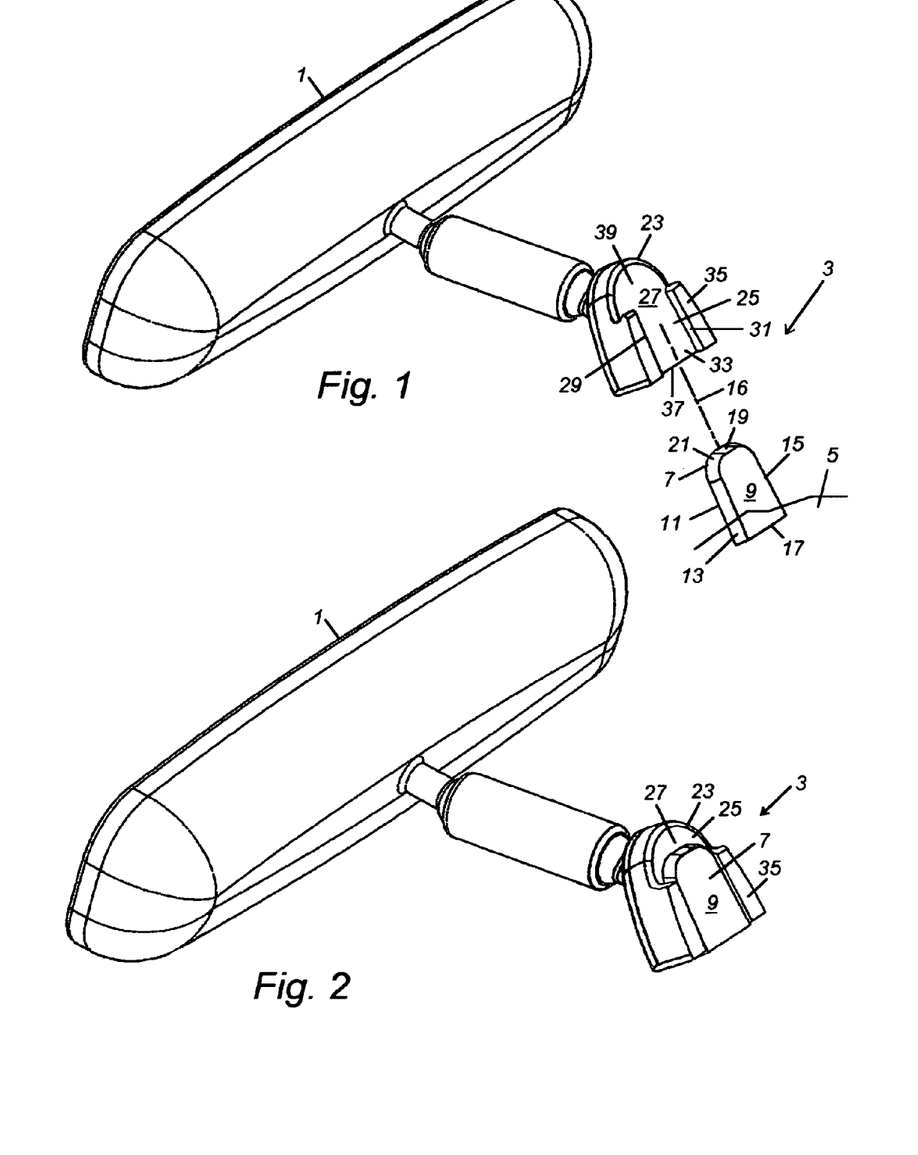
FIG. 1 is an exploded view showing an example of the mounting of a rearview mirror on an on automobile windscreen or windshield utilizing one mounting structure of a type well-known prior art.
FIG. 2 is a perspective view showing an assembly of the prior art mounting structure.

FIG. 1 is an exploded view showing an example of the mounting of a rearview mirror 1 on an on automobile windscreen or windshield 5 utilizing one mounting structure 3 of a type well-known prior art, as disclosed for example in U.S.

Pat. No. 5,377,948, which is incorporated here by reference. Here, mirror 1 is being mounted/dismounted on a wedge coupler 7. Wedge coupler 7 is generally flat in aspect having substantially parallel opposing front and rear planar surfaces 9 and 11 spaced apart by opposing exterior side surfaces 13 and 15 in between. Front surface 9 bonded or otherwise adhered to the inside surface of windshield 5. Typically, opposing side surfaces 13, 15 are inclined relative to a longitudinal axis 16 so as to appear convergent. Rear surface 11 is wider than front surface 9 such that opposing side surfaces 13, 15 are beveled or tapered toward windshield 5 outwardly from narrower front surface 9 toward wider rear surface 11, whereby the width of rear surface 11 is greater than the width of front surface 9. Furthermore, opposing side surfaces 13, 15 are slightly curved or tapered along longitudinal axis 16 from base 17 of wedge coupler 7 toward its crown 19 such that wedge coupler 7 narrows slightly from base 17 toward crown 19 which may include a narrower pointed or curved lead-in 21 for ease of mounting mirror 1 along axis 16.

A mounting base portion 23 of rearview mirror 1 includes a front coupler receiver slot 25 formed as a negative wedge-shaped opening that is matched to wedge coupler 7. Receiver slot 25, which is sometimes also known as a "channel mount," is slidably received over the wedge coupler 7. Receiver slot 25 is formed with a rear planar interior surface 27 positioned between opposing interior side surfaces 29 and 31 that are spaced apart identically to opposing side surfaces 13, 15 of wedge coupler 7. Rear interior surface 27 is wider than an opening 33 between spaced apart opposing interior side surfaces 29, 31 on an front exterior surface 35 of mounting base portion 23 such that opposing interior side surfaces 29, 31 are beveled or tapered from wider rear interior surface 27 toward narrower front opening 33 and windshield 5. Accordingly, front receiver slot 25 is wider at rear interior surface 27 and narrows toward opening 33 in front exterior surface 35.

Furthermore, interior side surfaces 29, 31 of coupler receiver slot 25 are slightly curved or tapered along longitudinal axis 16 from base 37 toward its crown 39, such that interior side surfaces 29, 31 narrow slightly from base 37 toward crown 39 identically to opposing side surfaces 13, 15 of wedge coupler 7. Opening 33 in front exterior surface 35 provides space between opposing interior side surfaces 29, 31 of receiver slot 25 for fitting base portion 23 over wedge coupler 7 on windshield 5 along axis 16.

FIG. 2 illustrates rearview mirror 1 mounted on windshield 5 by mating coupler receiver slot 25 of mounting base portion 23 on wedge coupler 7. As illustrated, the base-to-crown size and curvature or inclination of interior side surfaces 29, 31 of coupler receiver slot 25 mates with the base-to-crown curvature or taper of opposing side surfaces 13, 15 of wedge coupler 7, and the size and interior-to-exterior inclination of opposing tapered interior side surfaces 29, 31 of coupler receiver slot 25 mates with the rear-to-front bevel or taper of opposing inclined side surfaces 13, 15 of wedge coupler 7, such that wedge coupler 7 is wedged into coupler receiver slot 25 when received into mounting base portion 23 of rearview mirror 1. Matching of opposing inclined interior side surfaces 29, 31 of coupler receiver slot 25 of mirror mounting base 23 with opposing inclined side surfaces 13, 15 of wedge coupler 7 effectively secures rearview mirror 1 on windshield 5 when wedge coupler 7 is mounted in generally upright orientation along axis 16 with its crown 19 above its base 17.

Rearview mirror 1 is typically flexibly mounted. For example, mirror 1 may be mounted on an arm 41 that is positionable relative to mounting base portion 23, For example, arm 41 utilizes one or more ball-and-socket joints 43 for repositioning mirror 1 relative to mounting base portion 23.

Figure 3:
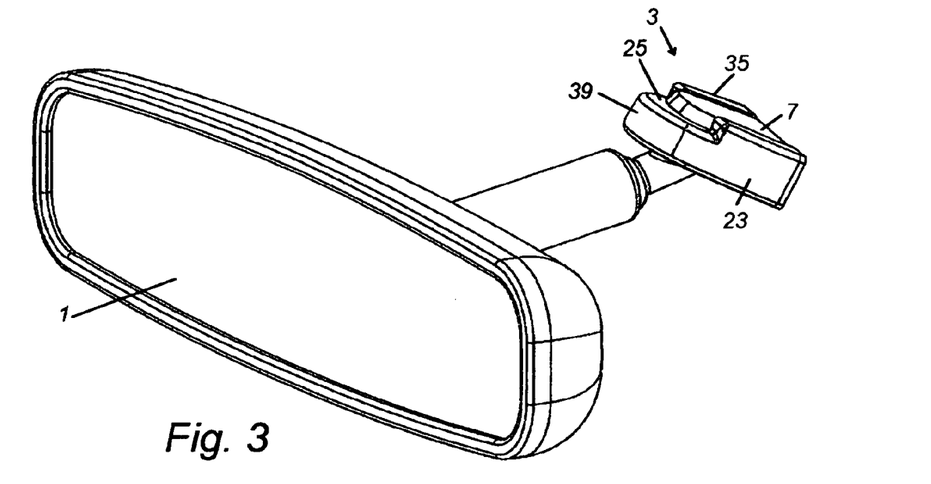
FIG. 3 is another view showing the assembly of the prior art mounting structure.
Figure 4:
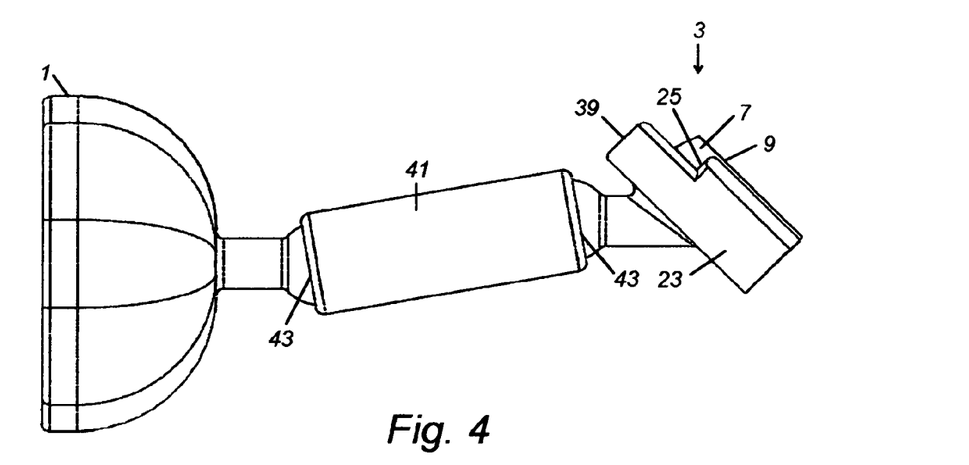
FIG. 4 is a side view showing assembly of the prior art mounting structure.
Figure 5:
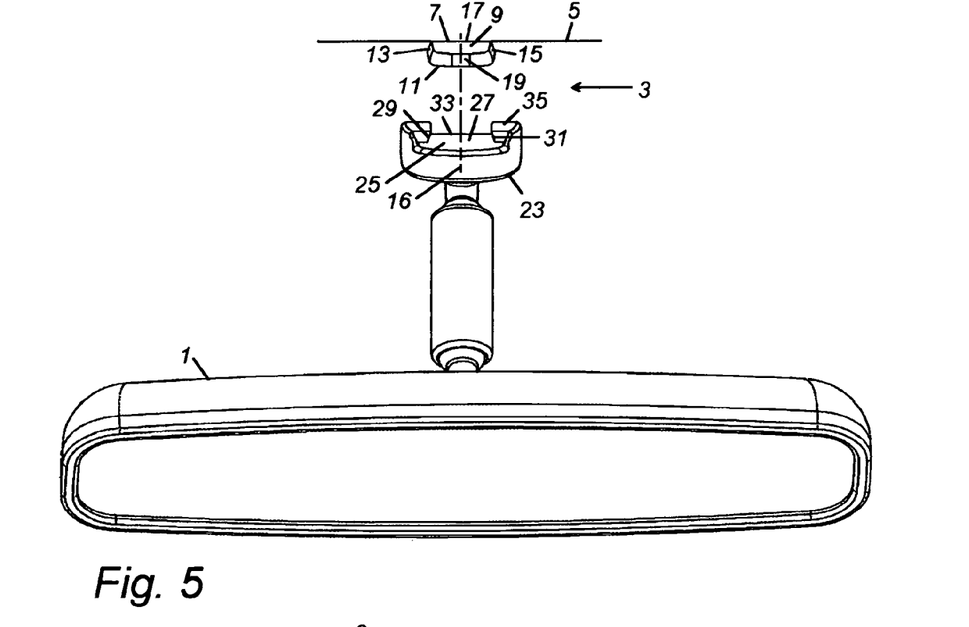
FIG. 5 is another exploded view showing the assembly of the prior art mounting structure.
Figure 6:
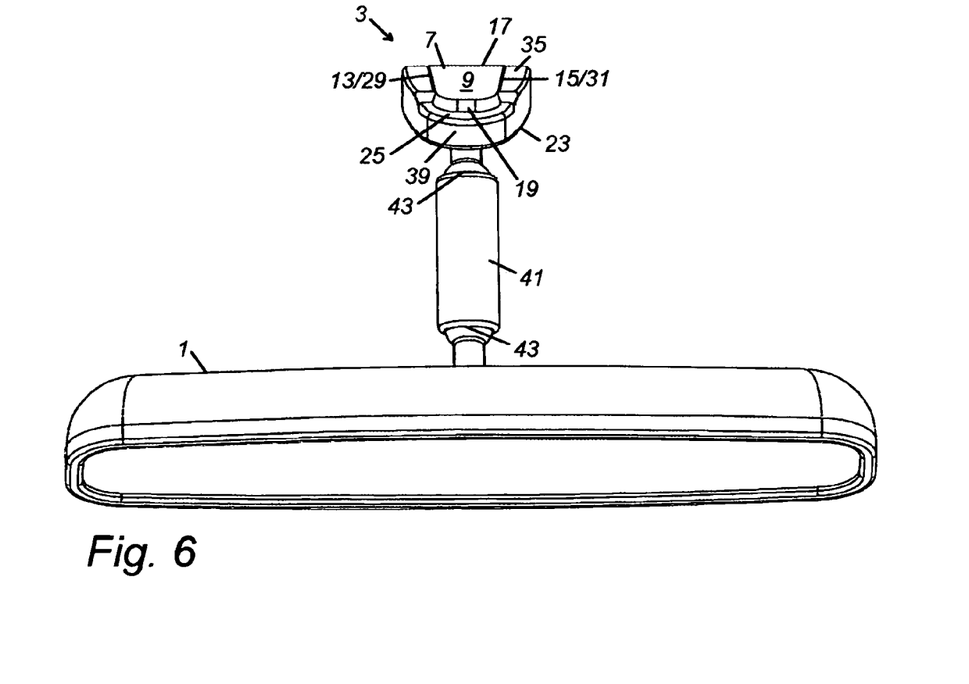
FIG. 6 is another view showing the assembly of the prior art mounting structure.
Figures 7, 8, 10:
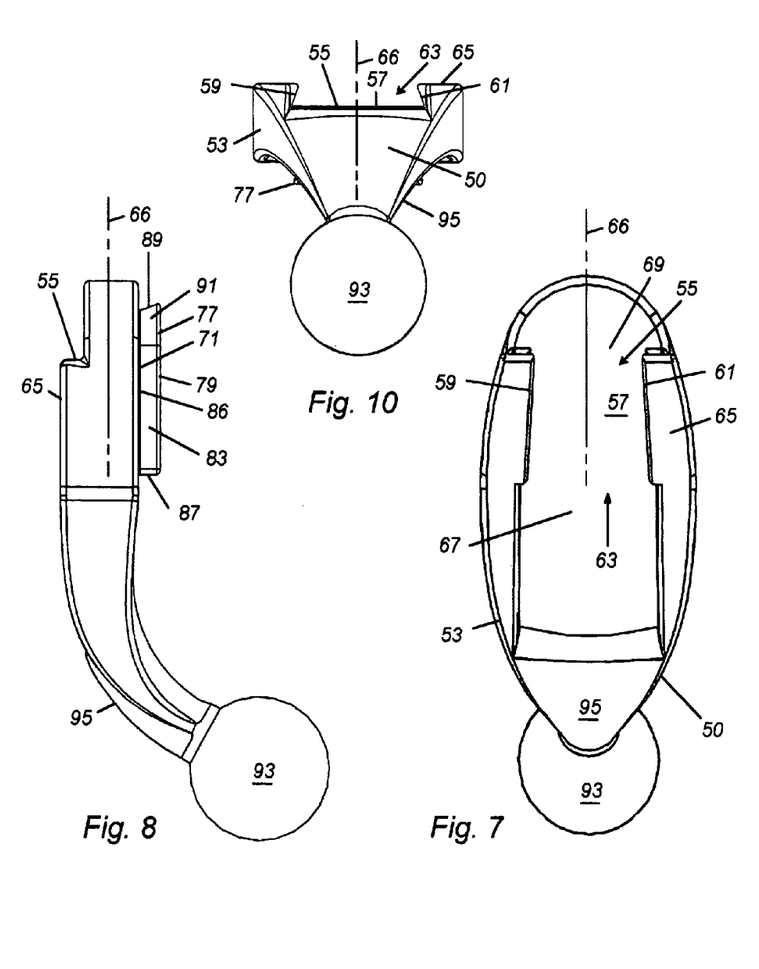
FIG. 7 is a front elevation view that illustrates a novel quick release mirror adapter mounting device for mounting rearview mirror on a windshield.
FIG. 8 is a side elevation view of novel quick release mirror adapter mounting device.
FIG. 10 is a top elevation view of novel quick release mirror adapter mounting device.
Figure 9:
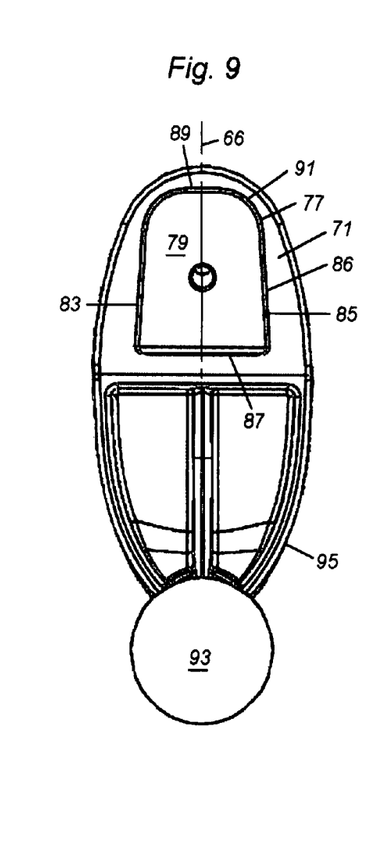
FIG. 9 is a rear elevation view of novel quick release mirror adapter mounting device.

FIG. 3 is a front perspective view showing rearview mirror 1 mounted on windshield 5 by coupler receiver slot 25 of mounting base portion 23 mated with wedge coupler 7 along axis 16. FIG. 4 is a side view showing rearview mirror 1 mounted on windshield 5 by coupler receiver slot 25 of mounting base portion 23 mated with wedge coupler 7. FIG. 5 is an exploded view as seen from above showing mounting of rearview mirror 1 on windshield 5 by mating coupler receiver slot 25 of mounting base portion 23 on wedge coupler 7. FIG. 6 is a top view showing rearview mirror 1 mounted on windshield 5 by coupler receiver slot 25 of mounting base portion 23 mated with wedge coupler 7.

FIGS. 7-10 disclose a novel quick release mirror adapter mounting device 50 for mounting rearview mirror 1 on windshield 5. A rigid mounting base portion 53 of adapter 50 is formed with a coupler receiver slot 55 formed substantially the same as coupler receiver slot 25 on front surface 35 of mounting base portion 23 of rearview mirror 1 so as to securely receive wedge coupler 7 on windshield 5 in the same manner as receiver slot 25. Accordingly, coupler receiver slot 55 is formed as a negative wedge-shaped opening that is matched to wedge coupler 7. Similarly to receiver slot 25 of mounting base portion 23, coupler receiver slot 55 is formed with a rear planar interior surface 57 positioned between opposing interior side surfaces 59 and 61 that are spaced apart identically to opposing side surfaces 13, 15 of wedge coupler 7. Rear interior surface 57 is wider than an opening 63 between spaced apart opposing interior side surfaces 59, 61 on an front exterior surface 65 of mounting base portion 53 such that opposing interior side surfaces 59, 61 are beveled or tapered from wider rear interior surface 57 toward narrower front opening 63 at exterior surface 65. Accordingly, front coupler receiver slot 55 is wider at rear interior surface 57 and narrows toward opening 63 in front exterior surface 65.

Furthermore, interior side surfaces 59, 61 of coupler receiver slot 55 are slightly curved or tapered along longitudinal axis 66 from base 67 toward its crown 69, such that interior side surfaces 59, 61 narrow slightly from base 67 toward crown 69 identically to opposing side surfaces 13, 15 of wedge coupler 7. Opening 63 in front exterior surface 65 provides space between opposing interior side surfaces 59, 61 of receiver slot 55 for fitting mounting base portion 53 of adapter 50 over wedge coupler 7 on windshield 5 along axis 66.

A rear exterior surface 71 opposite from front surface 65 of mirror adapter 50 is formed with a rigid wedge coupler 77 that mimics wedge coupler 7 on windshield 5. Wedge coupler 77 is projected from surrounding rear exterior surface 71 of mirror adapter 50. Wedge coupler 77 is generally flat in aspect having a rear planar exterior surface 79 and opposing exterior side surfaces 83 and 85 in between. Projected rear exterior surface 79 substitutes for front surface 9 of wedge coupler 7 where it is bonded to the inside surface of windshield 5. Opposing side surfaces 83, 85 are inclined relative to longitudinal axis 66 so as to appear convergent toward surrounding rear exterior surface 71. Projected rear exterior surface 79 is wider than base 86 of wedge coupler 77 such that opposing side surfaces 83, 85 are beveled or tapered toward windshield 5 outwardly from narrower surrounding rear exterior surface 71 toward wider projected rear exterior surface 79, whereby the width of projected rear exterior surface 79 is greater than the width of base 86. Furthermore, opposing side surfaces 83, 85 are slightly curved or tapered along longitudinal axis 66 from base 87 of wedge coupler 77 toward its crown 89 such that wedge coupler 77 narrows slightly from base 87 toward crown 89 which also may include a narrower pointed or curved lead-in 91 for ease of mounting mirror 1. Wedge coupler 77 on rear exterior surface 71 of mirror adapter 50 thus substitutes for wedge coupler 7 on windshield 5.

Furthermore, mirror adapter 50 includes a ball coupler 93. For example, ball coupler 93 is formed with a part-spherical shape that permits formation of a ball-and-socket joint with an appropriate clamp mechanism. Ball coupler 93 is spaced away from wedge coupler 77 sufficiently to allow access by a clamp mechanism, for example but not limited to the type of clamp mechanism disclosed by the inventor in U.S. Pat. No. 5,845,885, which is incorporated here by reference. Accordingly, ball coupler 93 is projected on a rigid arm member 95. According to one embodiment, arm 95 is bent or curved rearwardly away from front exterior surface 65 of mirror adapter mounting base 53 so as to avoid windshield 5 and provide easier access for the clamp mechanism when mounted on wedge coupler 7 on inside of windshield 5. Accordingly, ball coupler 93 is well positioned relative to the adapter mounting base 53 and windshield 5 for forming a ball-and-socket joint with the clamp mechanism.

Figures 11, 12:
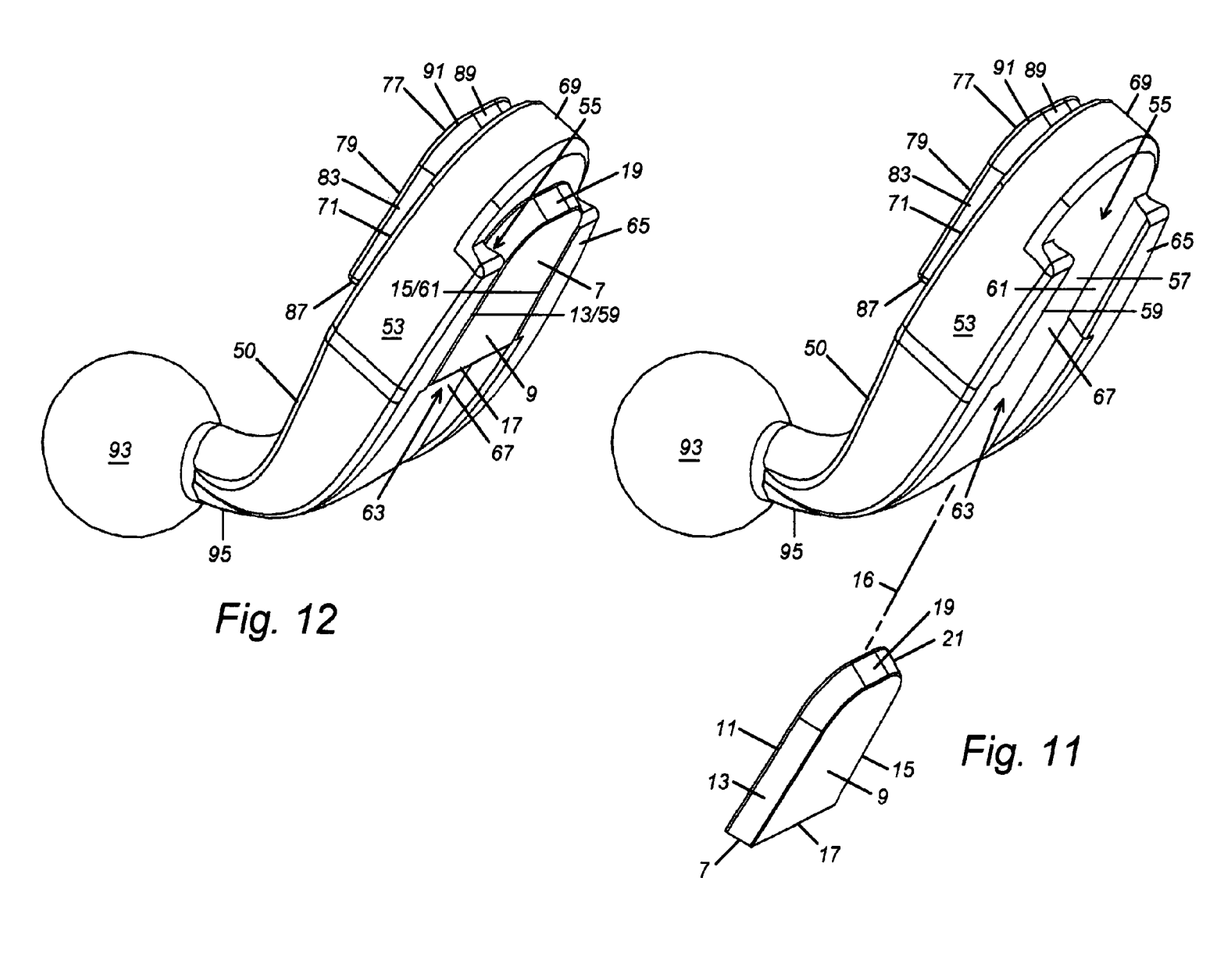
FIG. 11 is an exploded view showing assembly of mirror adapter with wedge coupler.
FIG. 12 illustrates the novel mirror adapter mounted on inside of a windshield.

FIG. 11 is an exploded view that illustrates assembly of mirror adapter 50 with wedge coupler 7. When front surface 9 of wedge coupler 7 is bonded on inside of windshield 5, coupler receiver slot 55 of adapter mounting base 53 is slidingly mated with wedge coupler 7. As illustrated, the base-to-crown size and curvature or inclination of interior side surfaces 59, 61 of coupler receiver slot 55 mates with the base-to-crown curvature or taper of opposing side surfaces 13, 15 of wedge coupler 7, and the size and interior-to-exterior inclination of opposing tapered interior side surfaces 59, 61 of coupler receiver slot 55 mates with the rear-to-front bevel or taper of opposing inclined side surfaces 13, 15 of wedge coupler 7, such that wedge coupler 7 is wedged into coupler receiver slot 55 when received into mounting base portion 53 of mirror adapter 50. Matching of opposing inclined interior side surfaces 59, 61 of coupler receiver slot 55 of mirror mounting base 53 with opposing inclined side surfaces 13, 15 of wedge coupler 7 effectively secures mirror adapter 50 on windshield 5 when wedge coupler 7 is mounted in generally upright orientation along axis 16 with its crown 19 above its base 17, the same as mating front receiver slot 25 of rearview mirror 1 onto wedge coupler 7.

FIG. 12 illustrates mirror adapter 50 mounted on inside of windshield 5 where it is secured by mating of its coupler receiver slot 55 with the beveled or tapered wedge shape of wedge coupler 7.

Figures 13, 14, 15:
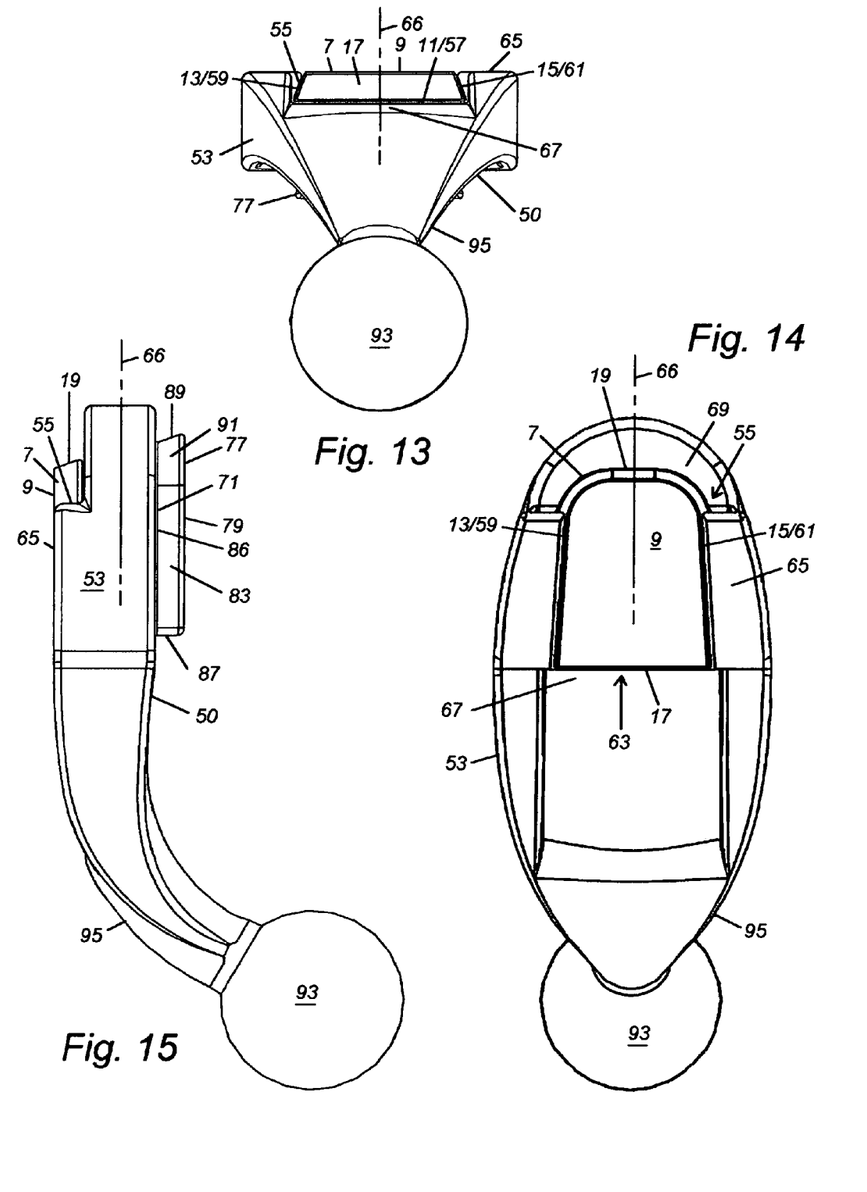
FIG. 13 is a top view showing the novel mirror adapter assembled with wedge coupler.
FIG. 14 is a front view showing novel mirror adapter assembled with wedge coupler.

FIGS. 13, 14 and 15 are top, front and side elevation views, respectively, showing mirror adapter 50 assembled with wedge coupler 7 on inside of windshield 5. FIG. 15 particularly illustrates that, when projected rearwardly on rigid arm 95, ball coupler 93 is well positioned relative to the adapter mounting base 53 and windshield 5 for forming a ball-and-socket joint with the clamp mechanism.

Figures 16, 17:
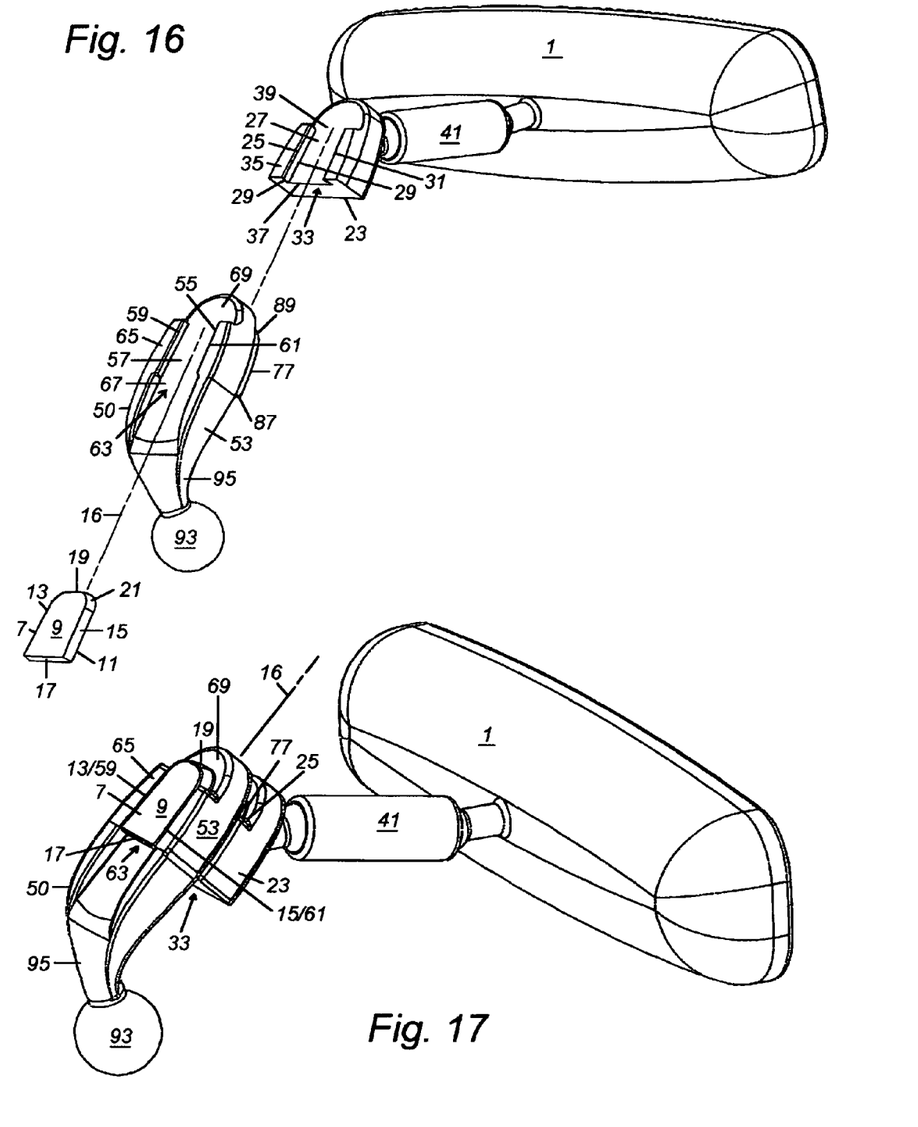
FIG. 16 is an exploded view that illustrates assembly of the novel mirror adapter between the wedge coupler on the windshield and the rearview mirror.
FIG. 17 illustrates the novel mirror adapter interposed between the wedge coupler on the windshield and the rearview mirror.

FIG. 16 is an exploded view that illustrates assembly of mirror adapter 50 with wedge coupler 7, and further illustrates assembly of mirror 1 with mirror adapter 50. Mirror adapter 50 is assembled with wedge coupler 7 on inside of windshield 5 as disclosed herein.

Either before or after mirror adapter 50 is assembled with wedge coupler 7, mirror 1 is assembled with adapter 50 by mating coupler receiver slot 25 of mounting base portion 23 of mirror 1 on wedge coupler 77. As illustrated, the base-to-crown size and curvature or inclination of interior side surfaces 29, 31 of coupler receiver slot 25 mates with the base-to-crown curvature or taper of opposing side surfaces 83, 85 of wedge coupler 77, and the size and interior-to-exterior inclination of opposing tapered interior side surfaces 29, 31 of coupler receiver slot 25 mates with the rear-to-front bevel or taper of opposing inclined side surfaces 83, 85 of wedge coupler 77, such that wedge coupler 77 is wedged into coupler receiver slot 25 when received into mounting base portion 23 of rearview mirror 1. Matching of opposing inclined interior side surfaces 29, 31 of coupler receiver slot 25 of mirror mounting base 23 with opposing inclined side surfaces 83, 85 of wedge coupler 77 effectively secures rearview mirror 1 on windshield 5 when coupler receiver slot 55 of mirror adapter 50 is mated with wedge coupler 7 on inside of windshield 5.

FIG. 17 illustrates mirror adapter 50 mounted on inside of windshield 5 where it is secured by mating of its coupler receiver slot 55 with the beveled or tapered wedge shape of wedge coupler 7, and further illustrates rearview mirror 1 secured by mating its coupler receiver slot 25 with the beveled or tapered wedge shape of wedge coupler 77 of novel mirror adapter 50. As illustrated here, interposing of novel mirror adapter 50 between wedge coupler 7 and mirror 1 effectively positions rearview mirror 1 relative to windshield 5 nearly identically to mirror 1 being mounted directly onto wedge coupler 7, with rearview mirror 1 being merely offset slightly from the inside of windshield 5 by a slight thickness 97 of mounting base portion 53 between its opposing front exterior surface 65 and rear exterior surface 71. Thus, positioned by mounting on windshield 5 with mirror adapter 50 therebetween, rearview mirror 1 can be adjusted to a convenient position by the vehicle operator.

Furthermore, novel mirror adapter 50 interposed between wedge coupler 7 and mirror 1 presents ball coupler 93 in a useful position relative to windshield 5 and adjacent to rearview mirror 1 for mounting another useful device, such as a GPS (global positioning system) receiver or cellular telephone, to name a few possibilities.

Novel mirror adapter mounting device 50 is adapted for quick installation and quick release because its coupler receiver slot 55 in mounting base portion 53 is quickly and easily mounted over wedge coupler 7 on windshield 5, while coupler receiver slot 25 in mounting base portion 23 of rearview mirror 1 is just as quickly and easily mounted over wedge coupler 77 projected from surrounding rear exterior surface 71 of mirror adapter 50. As illustrated herein, a user can quickly slip mounting base portion 23 of rearview mirror 1 off of wedge coupler 7. Novel mirror adapter mounting device 50 is quickly and easily slipped over wedge coupler 7 on windshield 5. Then, mounting base portion 23 of rearview mirror 1 is quickly and easily slipped over wedge coupler 77 of mirror adapter 50. Presto! The novel mirror adapter mounting device 50 is mounted between rearview mirror 1 and wedge coupler 7 on windshield 5. Just as quickly and easily, mirror adapter mount 50 is retrieved from between rearview mirror 1 and wedge coupler 7 by simply reversing this assembly process.

As further disclosed herein, the order of assembly and disassembly of rearview mirror 1 with mirror adapter mounting device 50, and that of mirror adapter mounting device 50 with wedge coupler 7 on windshield 5 is optionally operated in the opposite order. As such, rearview mirror 1 is mounted to novel mirror adapter mounting device 50 before mirror adapter 50 is mounted to wedge coupler 7 on windshield 5.

Figure 18:
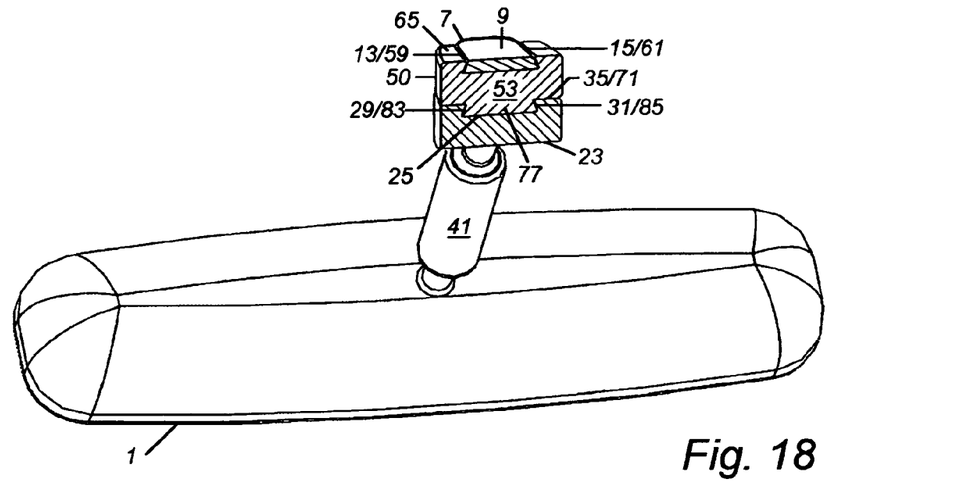
FIG. 18 is a cross-section through a mounting base portion of the rearview mirror, the novel mirror adapter and the wedge coupler mounted on the windshield.

FIG. 18 illustrates a cross-section through mounting base portion 23 of mirror 1, novel mirror adapter 50 and wedge coupler 7 on windshield 5, wherein a pair of substantially identical wedge joints 99 and 101 are formed by mating of coupler receiver slot 55 of mirror adapter 50 with the beveled or tapered wedge shape of wedge coupler 7, and mating of coupler receiver slot 25 of mirror 1 with the beveled or tapered wedge shape of wedge coupler 77 of novel mirror adapter 50.

Figure 19:
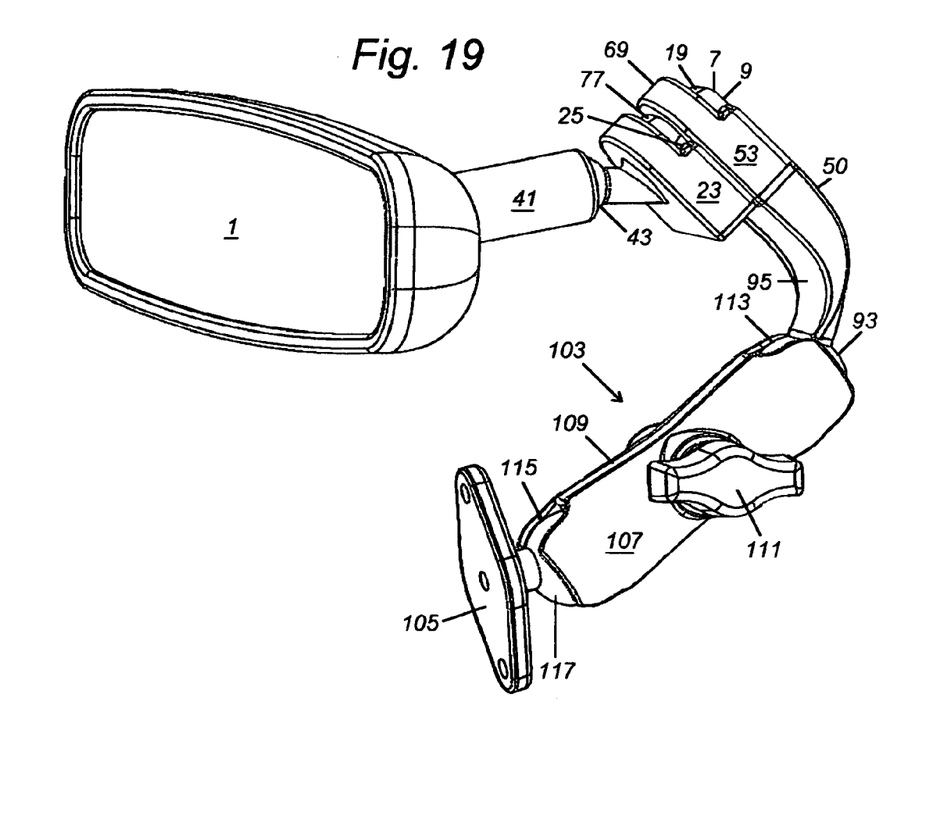
FIG. 19 illustrates the rearview mirror mounted on the windshield with the novel mirror adapter interposed between the wedge coupler and a coupler receiver slot of the mirror adapter.

FIG. 19 illustrates rearview mirror 1 mounted on windshield 5 with novel mirror adapter 50 interposed between wedge coupler 7 and coupler receiver slot 55 of mirror adapter 50. As illustrated here, novel mirror adapter 50 provides for mounting of mirror 1 in nearly identical positioning relative to windshield 5 as direct mounting on wedge coupler 7, while further presenting ball coupler 93 projected on rigid arm 95 adjacent to mirror 1. Accordingly, there is illustrated a clamp mechanism 103 positioning a mounting plate 105 relative to arm 95 of mirror adapter 50 and, consequently, relative to rearview mirror 1. For example, mounting plate 105 may be utilized for mounting the GPS receiver, cellular telephone or other device as may be desirable for use by the vehicle operator or passenger. According to one embodiment, clamp mechanism 103 includes a split arm assembly of a pair of relatively rigid arm sections 107 and 109 squeezed together by a clamping means 111 for forming a pair of adjustably positionable ball-and-socket joints 113 and 115 with ball coupler 93 of mirror adapter 50 and another ball coupler 117 formed on one side of mounting plate 105.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A mirror adapter mounting device, comprising:
a substantially rigid mounting base portion, wherein one surface of the base portion further comprises a wedge-shaped coupler structured for being received into a mating wedge-shaped receiver slot that is adapted for receiving a rearview mirror, and a different surface of the base portion further comprises a wedge-shaped receiver slot that is adapted for receiving thereinto a mating wedge-shaped coupler of the rearview mirror for mounting of the same;
a part-spherical ball coupler; and
an arm projected from the mounting base portion and presenting the ball coupler adjacent to an end of the arm distal from the mounting base portion.

2. The device of claim 1, wherein the surface comprising the wedge-shaped coupler is positioned substantially opposite from the surface comprising the wedge-shaped receiver slot.

3. The device of claim 1, wherein the ball coupler is further presented adjacent to the surface of the mounting base portion comprising the wedge-shaped coupler.

4. The device of claim 1, wherein the wedge-shaped coupler is further substantially similar to a wedge-shaped coupler of a type adapted for coupling to a surface of a windshield of a vehicle, and wherein the wedge-shaped receiver slot is further adapted to receive the wedge-shaped coupler of a type adapted for coupling to a surface of a windshield of a vehicle.

5. The device of claim 1, wherein the wedge-shaped receiver slot of the wedge-shaped coupler of the mounting base portion further comprises a substantially planar interior surface positioned between opposing interior side surfaces that are spaced apart and mutually tapered to form an opening therebetween that is narrower than the substantially planar interior surface positioned therebetween; and wherein the wedge-shaped coupler of the mounting base portion further comprises a substantially planar exterior surface spaced away from the surface of the mounting base portion by a pair of opposing exterior side surfaces that are mutually tapered from the exterior surface toward the surface of the mounting base portion.

6. The device of claim 5, wherein the opposing interior side surfaces of the wedge-shaped receiver slot of the wedge-shaped coupler of the mounting base portion are further mutually tapered relative to a longitudinal axis of the slot; and wherein the opposing exterior side surfaces of the wedge-shaped coupler of the mounting base portion are further mutually tapered relative to a longitudinal axis of the coupler.

7. The device of claim 6, wherein the longitudinal axis of the coupler is substantially parallel with the longitudinal axis of the slot.

8. The device of claim 7, wherein the wedge-shaped receiver slot further comprises a negative opening that is substantially matched to the wedge-shaped coupler.

9. A mirror adapter mounting system, comprising:
a wedge-shaped windshield coupler comprising substantially parallel opposing front and rear planar surfaces spaced apart by opposing exterior side surfaces therebetween, the front surface being relatively narrower than the rear surface and being adapted for mounting on a windshield of a vehicle, and the opposing exterior side surfaces being tapered outwardly from the narrower front surface toward the wider rear surface;
a mirror comprising a front coupler receiver slot formed as a negative wedge-shaped opening that is matched to the wedge-shaped windshield coupler, the receiver slot comprising a rear planar interior surface positioned between opposing interior side surfaces that are spaced apart and form an opening therebetween, the opening being relatively narrower than the rear interior surface, and the opposing interior side surfaces being tapered inwardly from the narrower opening toward the wider rear interior surface; and
a mirror adapter mounting device, comprising a substantially rigid base mounting base portion comprising:
a coupler receiver slot adapted to receive slidingly thereinto the wedge-shaped windshield coupler,
a wedge-shaped coupler adapted to slidingly enter into the front coupler receiver slot of the mirror, and
a ball coupler.

10. The system of claim 9, wherein the coupler receiver slot and the wedge-shaped coupler are further formed on different surfaces of the mirror adapter.

11. The system of claim 9, wherein the different surfaces of the mirror adapter having the coupler receiver slot and the wedge-shaped coupler formed thereon further comprise substantially opposite surfaces of the mirror adapter.

12. The system of claim 9, wherein the coupler receiver slot of the mirror adapter mounting device further comprises a negative wedge-shaped opening that is matched to the wedge-shaped windshield coupler, the receiver slot comprising a rear planar interior surface positioned between opposing interior side surfaces that are spaced apart and form an opening therebetween, the opening being relatively narrower than the rear interior surface, and the opposing interior side surfaces being tapered inwardly from the narrower opening toward the wider rear interior surface; and wherein the wedge-shaped coupler of the mirror adapter mounting device further comprises a base portion adjacent to an exterior surface of the mirror adapter mounting device and a rear planar surface spaced away from the base portion by opposing exterior side surfaces therebetween, the base portion being relatively narrower than the rear surface, and the opposing exterior side surfaces being tapered outwardly from the narrower base portion toward the wider rear surface.

13. The system of claim 12, wherein the opposing exterior side surfaces of the wedge-shaped windshield coupler further comprise a taper relative to a longitudinal axis of the wedge-shaped windshield coupler;
   wherein the opposing interior side surfaces of the front coupler receiver slot of the mirror further comprise a taper relative to a longitudinal axis of the front coupler receiver slot;
   wherein the opposing interior side surfaces of the coupler receiver slot of the mirror adapter mounting device further comprise a taper relative to a longitudinal axis of the coupler receiver slot; and
   wherein the opposing exterior side surfaces of the wedge-shaped coupler of the mirror adapter mounting device further comprise a taper relative to a longitudinal axis of the wedge-shaped coupler.

14. The system of claim 13, wherein the longitudinal axes of the coupler receiver slot of the mirror adapter mounting device and the wedge-shaped coupler of the mirror adapter mounting device are further substantially parallel.

15. The system of claim 13, wherein the mirror adapter mounting device further comprises a substantially rigid arm member projected from a rigid mounting base portion thereof comprising the wedge-shaped coupler and the coupler receiver slot thereof, the ball coupler of the mirror adapter mounting device being presented adjacent to an end portion of the arm member distal from the mounting base portion thereof.

16. The system of claim 15, wherein the narrower front surface of the wedge-shaped windshield coupler is further coupled to a surface of a windshield.

17. A method for providing an auxiliary ball coupler on a vehicle minor mount, the method comprising:
   on a windshield having a wedge-shaped windshield coupler comprising a relatively narrower surface coupled to a surface of the windshield and a relatively wider surface spaced away therefrom with opposing tapered side surfaces therebetween, and a mirror comprising a wedge-shaped receiver slot being wedgedly engaged with the wedge-shaped windshield coupler, disengaging the wedge-shaped receiver slot of the mirror from the wedge-shaped windshield coupler;
   between the wedge-shaped windshield coupler and the wedge-shaped receiver slot of the mirror, engaging a mirror adapter mounting device, comprising: wedgedly engaging a wedge-shaped receiver slot of the mirror adapter mounting device with the wedge-shaped windshield coupler, and wedgedly engaging a wedge-shaped mirror coupler with the wedge-shaped receiver slot of the mirror; and
   from the mirror adapter mounting device projecting a substantially part-spherical ball coupler.

18. The method of claim 17, further comprising providing the mirror adapter mounting device, comprising the wedge-shaped receiver slot and the wedge-shaped mirror coupler thereof on different surfaces of a substantially rigid base mounting base portion, and the ball coupler extended therefrom on a substantially rigid arm member.

19. The method of claim 18, wherein disengaging the wedge-shaped receiver slot of the mirror from the wedge-shaped windshield coupler further comprises slidingly disengaging the wedge-shaped receiver slot of the mirror from the wedge-shaped windshield coupler;
   wherein engaging a wedge-shaped receiver slot of the mirror adapter mounting device with the wedge-shaped windshield coupler further comprises slidingly engaging the wedge-shaped receiver slot of the mirror adapter mounting device with the wedge-shaped windshield coupler; and
   wherein engaging a wedge-shaped mirror coupler with the wedge-shaped receiver slot of the mirror further comprises slidingly engaging the wedge-shaped mirror coupler with the wedge-shaped receiver slot of the mirror.

20. The method of claim 19, wherein providing the wedge-shaped receiver slot and the wedge-shaped mirror coupler on different surfaces of the substantially rigid base mounting base portion of the mirror adapter mounting device further comprises providing the wedge-shaped receiver slot and the wedge-shaped mirror coupler on substantially opposing of the substantially rigid base mounting base portion of the mirror adapter mounting device.

* * * * *